United States Patent [19]

Léchot

[11] Patent Number: 5,190,422

[45] Date of Patent: Mar. 2, 1993

[54] DEVICE FOR THE QUICK FASTENING OF A TOOL INTENDED TO BE DRIVEN IN ROTATION

[75] Inventor: André Léchot, Orvin, Switzerland

[73] Assignee: Precifar S.A., La Chaux-de-Fonds, Switzerland

[21] Appl. No.: 706,231

[22] Filed: May 28, 1991

[30] Foreign Application Priority Data

Jun. 18, 1990 [CH] Switzerland .................. 2016/90

[51] Int. Cl.⁵ ......................................... B23B 31/107
[52] U.S. Cl. ................................ 408/239 R; 279/82; 279/100; 279/904; 408/226
[58] Field of Search ............... 408/239 R, 226, 127, 408/239 A; 279/99, 7, 82, 1 B, 100, 904; 606/80; 403/341, 100, 320

[56] References Cited

U.S. PATENT DOCUMENTS

| | | | |
|---|---|---|---|
| 658,424 | 9/1900 | Brennan | 403/341 X |
| 804,185 | 11/1905 | Davison | 403/320 X |
| 1,067,878 | 7/1913 | Owens et al. | 279/100 |
| 1,390,931 | 9/1921 | Shamberger | 403/320 X |
| 1,889,571 | 11/1932 | Redinger | |
| 3,583,715 | 6/1971 | Jahrl | 279/82 X |
| 4,202,557 | 5/1980 | Haussmann et al. | 279/82 X |
| 4,626,146 | 12/1986 | Neumaier | 279/82 X |

FOREIGN PATENT DOCUMENTS 832373  1/1952  Fed. Rep. of Germany .
2138566 8/1973  Fed. Rep. of Germany .

*Primary Examiner*—Steven C. Bishop
*Attorney, Agent, or Firm*—Darby & Darby

[57] ABSTRACT

The quick-fastening device comprises only two parts separable during the fitting and removal of the bit, the first part being fixed to the tool and the second part being fixed to a motor-drive body. The axial locking and the rotational locking are ensured respectively by screwing and the engagement of two profiled ends of matching profiles.

6 Claims, 1 Drawing Sheet

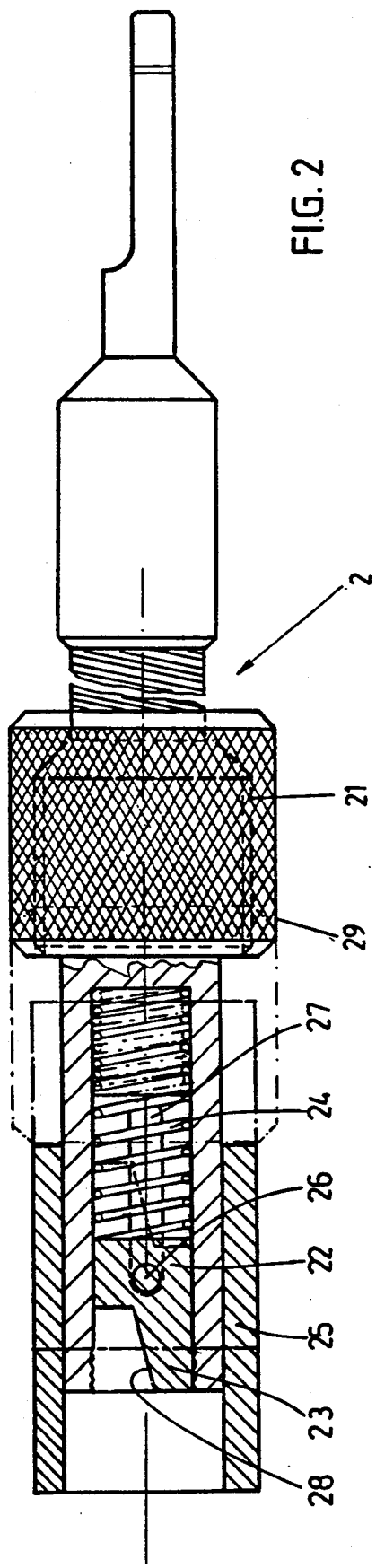
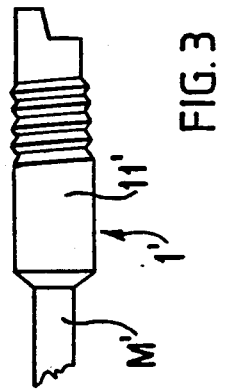
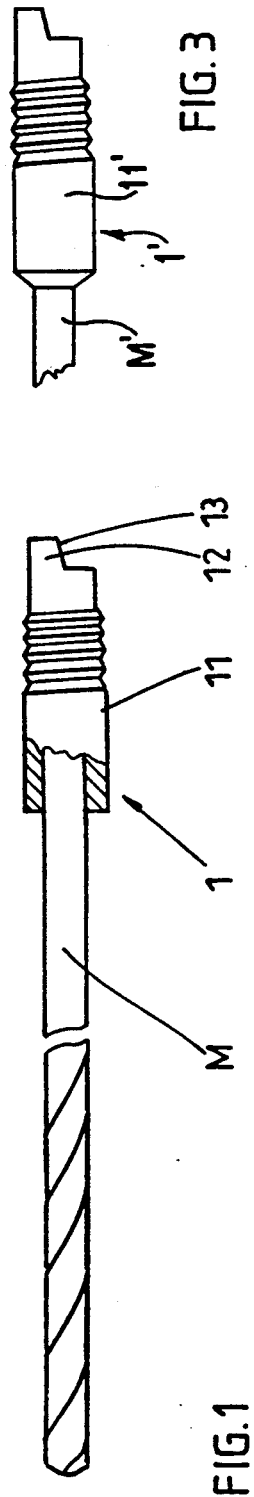

DEVICE FOR THE QUICK FASTENING OF A TOOL INTENDED TO BE DRIVEN IN ROTATION

FIELD OF THE INVENTION

The present invention relates to a device for the quick fastening of a tool intended to be driven in rotation, comprising means for fitting the tool without play and for fixing it to a motor-drive body in terms of rotational and translational movement.

The fastening device according to the invention is intended, above all, for fastening a surgical bit, but it is not limited to this type of tool.

PRIOR ART

In surgical operations, various bits have to be fitted to and removed from the motor-drive device very quickly.

In most of the known devices, the cylindrical shank of the bit is secured in a chuck with three jaws which are clamped by means of a key forming a third component to be handled. Effective clamping depends on the physical force exerted.

There is another known quick-fastening device for a surgical bit, in which the bit is secured firmly to a base equipped with two radial pins; mounted on the driving shank is a device fixed to the said shank; this device comprises a hollow cylindrical component, in which the base of the bit slides. The pins of the base are inserted into two slots made in this component, to prevent the base from rotating within the component. The bit is held in place by means of a serrated, internally threaded ring forming a cover. This cover is pierced in such a way as to allow the bit to pass through; the ring is screwed onto the outside, itself threaded, of the cylindrical component. To prevent the ring from being unscrewed inopportunely, a second likewise serrated ring is mounted elastically on the cylindrical component, so as to be capable of sliding in translational movement, whilst at the same time being blocked in terms of rotation, by means of a rib sliding in a slot of the cylindrical component.

Whilst substantially performing its quick-fastening function, this device of the prior art has disadvantages, in particular:

It leaves some play (slightly loose contact) in the positioning of the bit in the blocked position, this being a function of the serration and depth of the grooves.

It is necessary to handle two components, namely the serrated ring and the bit, in order to separate the latter from the motor-drive shank, and this can be annoying for a surgeon who is operating, there being the risk that the blocking ring will fall or go astray.

SUMMARY OF THE INVENTION

The object of the present invention is to provide a quick-fastening device for a surgical bit which does not have these disadvantages of the prior art.

This object is achieved by means of a device which comprises only two parts separable during the fitting and removal of the bit, the first part being fixed to the bit and the second part being fixed to the motor-drive body, and in which the said parts carry means for fitting them and for fixing them together in terms of translational movement by means of a rotation of the first part in relation to the second part, the said rotation can be blocked by blocking means located respectively on each of the two parts, and the said blocking means located on the second part can be actuated by the operator's hand.

Preferably, the two parts are fitted and fixed together by screwing them one into the other by means of matching threaded parts.

The screwing/unscrewing movement is blocked as a result of the coming into engagement, with the end of the base, of a component sliding within the second part and matched to the profile of this end. This sliding component is connected firmly, with or without intermediate components, to a component located outside the second part which the operator actuates in order to control the sliding. At least one of these components (sliding component, intermediate components, outer component) is blocked in terms of rotation in relation to the axis of the second part, thereby preventing the rotation of the assembly as a whole. This assembly can consist only of an outer ring, through which passes a transverse rod or dowel sliding in two longitudinal slots of the second part. The rod can be maintained in the position in which it comes into engagement with the end of the base by means of a spring.

The bit and base can be machined in one piece. However, a hollow cylindrical base can also be produced separately and receive the bits with cylindrical shanks currently used, for example of a diameter of 2.35 mm.

BRIEF DESCRIPTION OF THE DRAWINGS

The accompanying drawing illustrates an embodiment of the invention by way of example.

FIG. 1 is a partially sectioned view of a surgical bit inserted into the first part of the fastening or male part.

FIG. 2 shows the second part, or female part, fixed to a flexible motor-drive shank equipped (right-hand part of FIG. 1) with a junction component with a motor. The shank and the junction component do not form part of the invention.

FIG. 3 is a fragmentary view, similar to FIG. 1, showing an alternative embodiment of a surgical bit in accordance with the invention.

DESCRIPTION OF THE PREFERRED EMBODIMENT

The first part 1 consists of a hollow cylindrical base 11, in which the bit M is inserted, this base being partially threaded externally and extended by an approximately semi-cylindrical first end 12, the face 13 being slightly oblique relative to the axis of the base. FIG. 1 illustrates a two-piece construction wherein the bit or tool M and the base 11 are two components fixedly joined together. The shank of the tool is received in an internal cavity in the base. FIG. 3 illustrates an alternative construction wherein the bit M' is integral with the base 11'. Otherwise, the constructions of FIGS. 1 and 3 are similar and perform the same functions in the same way. The following description makes reference to FIG. 1 but is equally applicable to the construction of FIG. 3. The second part 2 comprises a first hollow cylindrical component 21 threaded internally in such a way that the said base can be screwed into it, and a second cylindrical component 22 capable of sliding within the said first component and extended in the direction of the said base by an approximately semi-cylindrical second end 23, the face 28 being oblique relative to the axis, so as to form a profile matched to the profile of the end of the base and capable of coming into engagement, without play, with the said semi-cylindrical first end 12. A spring 24 arranged in the said first cylindrical component pushes the said second cylindrical component towards the outside of the said first cylindrical component; a ring 25 slides on the outside of the said first cylindrical component, and a dowel 26 is forced through transverse orifices of the said ring and of the said second cylindrical piece and slides in two longitudinal slots 27, 27' made in the said first cylindrical component.

The rotation of the second cylindrical component within the first cylindrical component is blocked by the dowel 26 sliding in the slots 27, 27'. The translational movement of the assembly formed by the ring, the second cylindrical component and the dowel is limited by the length of the longitudinal slots 27, 27'.

During the fitting, one hand of the operator holds the female part 2. With the thumb and index finger for example, the ring 25 is pulled rearwards. The other hand grasps the bit and screws the male part of the fastening into the female part. Towards the end of the screwing operation, the ring is released. When the ends 12 and 23 are opposite one another so that they can come into engagement, the spring 24 pushes the ring and the component 22 forwards, with the result that the assembly is blocked.

The threads do not perform a clamping function, but an axial-locking function in association with the exact fitting of the components 11 and 22 with one another by means of their ends 12 and 23 and with the inner cylinder of the component 21.

No self-clamping or self-release of the threads is liable to occur during operation, and the direction of these threads can therefore be identical or opposite to the direction of rotation of the tool during operation.

Perfect positioning of the bit consequently does not need a "forced" screwing home; there is therefore no risk of seizure, and for the removal it is sufficient to pull the ring rearwards (with the same hand as that holding the female part) and to unscrew without any force.

The device could be equipped with an additional safety device consisting, for example, of a nut 29 mounted on the part 21 between its base and the sliding ring 25 and making it possible to prevent the withdrawal of the sliding ring.

The fastening device according to the invention is also used advantageously in the sector of general mechanics, for example for fastening taps in a wrench or for fastening drill bits on hand drills.

I claim:

1. A device for quick fastening of a tool to drive means, comprising
   a first part having a cylindrical base for connecting to the tool, said base having an external thread; and
   a second part securable to the drive means, said second part including:
   a first hollow cylindrical component having an internal thread for cooperating with the external thread of said base of said first part for receiving said base in said first component,
   a second component slidable within said first component and engageable with said base to prevent base rotation relative to said second component, and
   hand-actuatable means including a ring member slidable over said first component for translationally moving said second component within said first component and for preventing rotation of said second component relative to said first component.

2. A device as claimed in claim 1 wherein said hand-actuatable means further includes a dowel extending through openings in said ring member and in said second component and slidable in longitudinal slots formed in said first cylindrical component; and a spring located in said first component for biasing said second component together with said dowel toward said base of said first part when said base is engaged.

3. A device as claimed in claim 1 wherein said base has an approximately semi-cylindrical profiled first end and a second end at which the tool is fixed, said second component having an end complementary to said first end of said base and engaging said first end to prevent rotation of said first part relative to said second part.

4. A device as claimed in claim 1, further comprising a blocking nut mounted on said second part and positioned for preventing unintentional sliding of said ring member over said first component.

5. A device as claimed in claim 1 wherein said first part and the tool are formed as one piece.

6. A device as claimed in claim 1 wherein the tool has a shank, and said base has an internal cavity for receiving the shank of the tool.

* * * * *